(12) United States Patent
Iwakuni

(10) Patent No.: US 7,977,991 B2
(45) Date of Patent: Jul. 12, 2011

(54) ADJACENT CHANNEL INTERFERENCE DETECTION APPARATUS AND METHOD

(75) Inventor: Kaoru Iwakuni, Mie (JP)

(73) Assignee: Panasonic Corporation, Osaka (JP)

( * ) Notice: Subject to any disclaimer, the term of this patent is extended or adjusted under 35 U.S.C. 154(b) by 461 days.

(21) Appl. No.: 12/304,151

(22) PCT Filed: Jun. 11, 2007

(86) PCT No.: PCT/JP2007/061753
§ 371 (c)(1),
(2), (4) Date: Dec. 10, 2008

(87) PCT Pub. No.: WO2008/001604
PCT Pub. Date: Jan. 3, 2008

(65) Prior Publication Data
US 2009/0197556 A1 Aug. 6, 2009

(30) Foreign Application Priority Data
Jun. 28, 2006 (JP) .................... 2006-178226

(51) Int. Cl.
*H04B 1/16* (2006.01)
(52) U.S. Cl. .................... 327/205; 327/226.3
(58) Field of Classification Search .............. 455/205, 455/209, 296, 303, 306, 307, 67.13, 226.3
See application file for complete search history.

(56) References Cited

U.S. PATENT DOCUMENTS

| | | | |
|---|---|---|---|
| 4,817,167 A | | 3/1989 | Gassmann |
| 5,517,689 A | * | 5/1996 | Hayashihara ................ 455/205 |
| 6,356,746 B1 | * | 3/2002 | Katayama .................... 455/324 |
| 6,778,589 B1 | | 8/2004 | Ishii |
| 6,961,552 B2 | * | 11/2005 | Darabi et al. ............... 455/241.1 |
| 2004/0096024 A1 | | 5/2004 | Uchino |

FOREIGN PATENT DOCUMENTS

| | | |
|---|---|---|
| EP | 0 939 496 | 9/1999 |
| JP | 11-239064 | 8/1999 |
| JP | 11-239065 | 8/1999 |
| JP | 2000-312155 | 11/2000 |
| JP | 2004-64382 | 2/2004 |
| JP | 2004-260528 | 9/2004 |
| JP | 2004-364049 | 12/2004 |

OTHER PUBLICATIONS

Supplementary European Search Report issued Nov. 18, 2009 in corresponding European Patent Application No. 07745042.7.
International Search Report issued Aug. 28, 2007 in the International (PCT) Application of which the present application is the U.S. National Stage.

* cited by examiner

*Primary Examiner* — Dinh T. Le
(74) *Attorney, Agent, or Firm* — Wenderoth, Lind & Ponack, L.L.P.

(57) ABSTRACT

To provide an adjacent channel interference detection apparatus having high detection sensitivity and suitable for LSI integration in a small circuit size. The adjacent channel interference detection apparatus (4) includes: two sign inversion detection units (13a and 13b) that respectively detect sign inversions of an I signal (101) and a Q signal (102); a rotation judgment unit (14) that detects a direction in which a signal point rotates on an IQ plane; a counter unit (15) that counts an output of the rotation judgment unit (14); and an adjacent channel interference detection unit (16) that detects an imbalance in the number of times the signal point rotates in each direction, from the count in the counter unit (15). Adjacent channel interference is detected by an imbalance between the number of times the signal point rotates clockwise and the number of times the signal point rotates counterclockwise on the IQ plane.

12 Claims, 8 Drawing Sheets

US 7,977,991 B2

ADJACENT CHANNEL INTERFERENCE DETECTION APPARATUS AND METHOD

TECHNICAL FIELD

The present invention relates to an adjacent channel interference detection apparatus and method suitable for a radio broadcast receiver and especially for an FM radio broadcast receiver.

BACKGROUND ART

Conventionally, radio broadcasting and FM radio broadcasting in particular are a key broadcast medium that occupies an importance place worldwide. Especially in Europe and the United States, an extremely large number of broadcast stations provide broadcasting within a limited frequency band, and it is common practice to space two or more broadcast stations closely such as 100 kHz or 200 kHz apart.

Such spacing of broadcast stations inevitably causes interference from a broadcast wave of a nearby broadcast station, namely, adjacent channel interference. This being so, measures for detecting and removing adjacent channel interference are conventionally required of FM radio receivers. Many techniques have been proposed for adjacent channel interference detection methods and apparatuses that form the basis of such measures and are therefore considered to be particularly important.

For example, techniques of detecting adjacent channel interference with high accuracy by counting a frequency of an intermediate frequency signal (hereafter abbreviated as "IF signal") using a counter and detecting a deviation from a predetermined frequency are disclosed in Patent References 1 and 2.

Moreover, a technique of detecting adjacent channel interference using a variation in DC component that is obtained as a result of smoothing an FM demodulated signal is widely known as described as a conventional technique in Patent References 1 and 2 and as a basic component in Patent Reference 3.

Patent Reference 1: Japanese Unexamined Patent Application Publication No. 11-239064
Patent Reference 2: Japanese Unexamined Patent Application Publication No. 11-239065
Patent Reference 3: Japanese Unexamined Patent Application Publication No. 2000-312155

DISCLOSURE OF INVENTION

Problems that Invention is to Solve

In recent years, it has become increasingly common in a radio broadcast receiver to convert an IF signal to a digital signal using an AD converter and digitally perform a reception and demodulation process for the IF signal. This creates the demand to integrate the components including the AD converter onto one LSI chip.

Under such circumstances, one possible method for realizing the structures of counting the frequency of the IF signal using the counter as disclosed in Patent References 1 and 2 is to count the frequency of the digitized IF signal generated by the AD converter.

In this case, since a delta-sigma AD converter is usually used as the AD converter, an output signal of the AD converter is a noise-shaped 1-bit signal. Hence it is necessary to extract a frequency component corresponding to the intermediate frequency using a dedicated filter and supply it to the counter. This requires a steep filter characteristic, and causes a significant increase in circuit size.

Another possible method is to branch an input analog signal of the AD converter to generate a binarized IF signal by an analog waveform shaping circuit, and perform the counting using the counter.

In this case, a dedicated analog cell needs to be provided on the LSI, and also a greater placement constraint is imposed for analog signal branching on an LSI substrate.

As described above, according to the structures disclosed in Patent References 1 and 2, in the case of digitally performing the reception and demodulation process for the IF signal and integrating the components onto one LSI chip, the problems such as the significant increase in circuit size, the need for the dedicated analog cell, and the constraint for analog signal line branching arise and make the implementation difficult.

Moreover, according to the FM demodulated signal smoothing structure which is described as a conventional technique in Patent References 1 and 2 and as a basic component in Patent Reference 3, the same implementation as in analog processing is possible even in the case of digitally performing the reception and demodulation process for the IF signal and integrating the components onto one LSI chip, but detection sensitivity is insufficient as pointed out in Patent References 1 and 2, and so it is problematic to use the structure singly.

The present invention has been developed to solve the above conventional problems, and has an object of providing an adjacent channel interference detection apparatus and method that can exhibit high detection sensitivity with a simple circuit structure, even in the case of digitally performing the reception and demodulation process for the IF signal and integrating the components onto one LSI chip.

Means to Solve the Problems

To solve the conventional problems, an adjacent channel interference detection apparatus according to the present invention is an adjacent channel interference detection apparatus that detects adjacent channel interference between broadcast waves of broadcast stations whose frequency bands are adjacent to each other, the adjacent channel interference detection apparatus including: a local oscillation unit that generates two signals of a predetermined frequency in a free-running state, the two signals of the predetermined frequency being different in phase from each other by 90 degrees; two mixer units that mix an input signal respectively with the two signals of the predetermined frequency generated by the local oscillation unit; two low pass filter units respectively connected to outputs of the two mixer units; a rotation judgment unit that detects a direction in which a signal point rotates on an IQ plane, according to an I signal and a Q signal outputted respectively from the two low pass filter units; a counter unit that counts an output of the rotation judgment unit; and a detection unit that detects an imbalance in the number of times the signal point rotates in each direction, according to the count by the counter unit.

Moreover, the adjacent channel interference detection apparatus according to the present invention further includes two sign inversion detection units that are respectively connected to outputs of the two low pass filter units, and detect inversions of signs of the I signal and the Q signal outputted from the two low pass filter units, wherein the rotation judgment unit is connected to outputs of the two sign inversion detection units, and detects the direction in which the signal point rotates on the IQ plane according to the signs of the I signal and the Q signal, the counter unit counts the output of the rotation judgment unit, and the detection unit detects the imbalance in the number of times the signal point rotates in each direction, according to the count by the counter unit.

According to these structures, the sign inversion detection units respectively detect the sign inversions of the I and Q components of the IF signal which has been converted to a digital signal and further to a complex baseband signal, and the rotation judgment unit detects, on the IQ plane, the rotation direction of the IF signal as a complex baseband signal. The counter unit counts the detected direction, and the detection unit detects an imbalance between the number of times the IF signal rotates clockwise and the number of times the IF signal rotates counterclockwise, with it being possible to determine whether or not adjacent channel interference occurs.

Thus, according to the present invention, an adjacent channel interference detection apparatus can be realized by an extremely simple structure, by merely adding a few processing blocks to a basic structure of digitally performing a reception and demodulation process for an IF signal.

Moreover, the adjacent channel interference detection apparatus according to the present invention further includes a magnitude comparison unit that is connected to outputs of the two low pass filter units, and detects a magnitude relation of the I signal and the Q signal, wherein the rotation judgment unit is connected to an output of the magnitude comparison unit, and detects the direction in which the signal point rotates on the IQ plane according to the magnitude relation, the counter unit counts the output of the rotation judgment unit, and the detection unit detects the imbalance in the number of times the signal point rotates in each direction, according to the count by the counter unit.

According to this structure, the magnitude comparison unit compares the I signal and the Q signal in magnitude, and the rotation judgment unit detects, on the IQ plane, the rotation direction of the IF signal as a complex baseband signal. The counter unit counts the number of times the IF signal moves from one area to another in each direction, and the detection unit detects an imbalance in the number of times the IF signal rotates in each direction, with it being possible to determine whether or not adjacent channel interference occurs.

To achieve the stated object, the present invention can also be realized as an adjacent channel interference detection method including steps corresponding to the characteristic units of the adjacent channel interference detection apparatus, or a program causing a computer to execute these steps. Such a program can be distributed via a recording medium such as a CD-ROM or a transmission medium such as the Internet.

Effects of the Invention

According to the present invention, an adjacent channel interference detection apparatus having high detection sensitivity and suitable for LSI integration can be realized in an extremely small circuit size, with there being no need for a dedicated filter which causes an increase in circuit size or a dedicated analog cell which impedes LSI integration.

NUMERICAL REFERENCES

Figure 1:
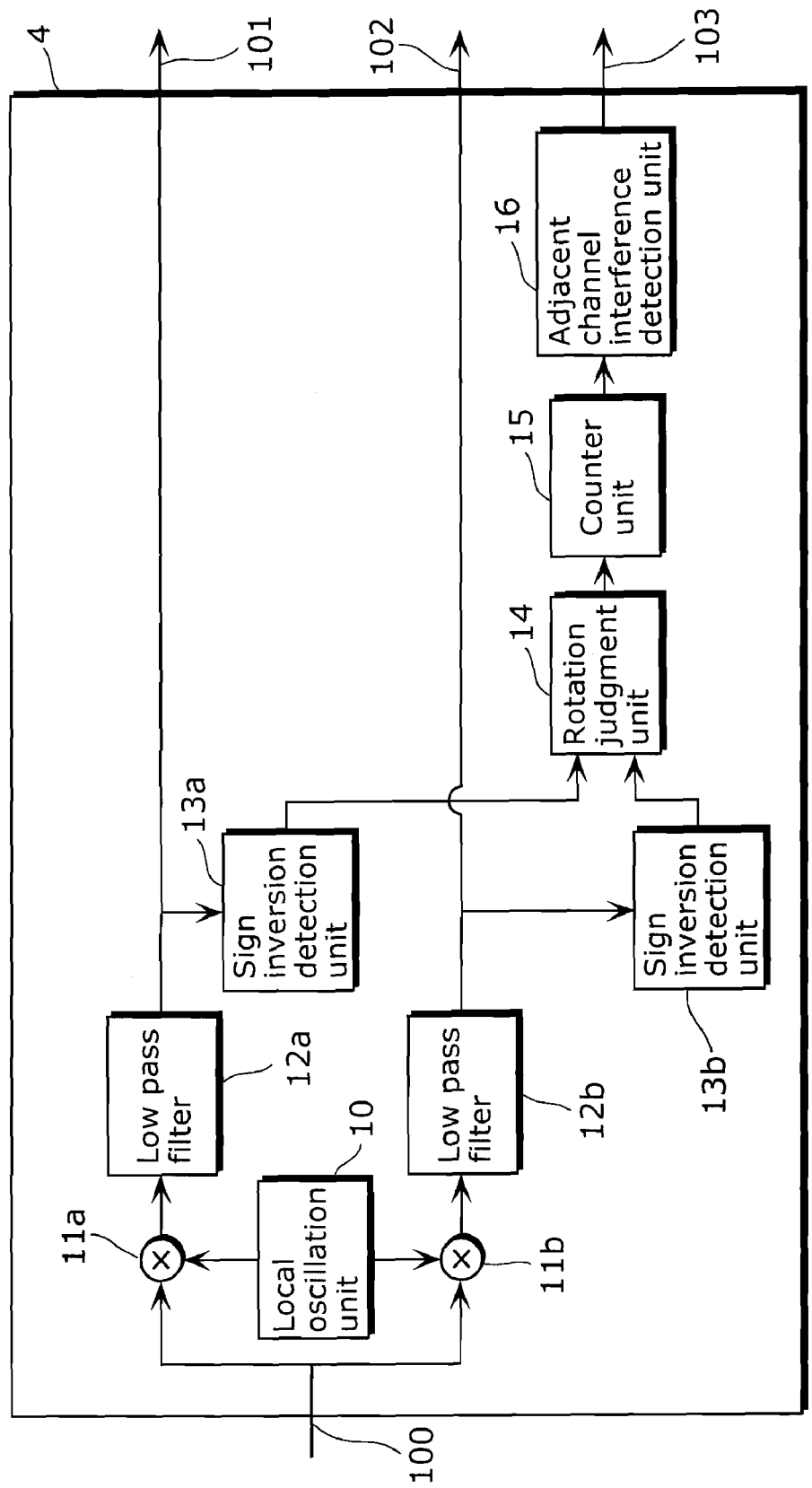
FIG. 1 is a block diagram showing a structure of an adjacent channel interference detection apparatus in a first embodiment of the present invention.

4 Adjacent channel interference detection apparatus
10 Local oscillation unit
11a, 11b Mixer unit
12a, 12b Low pass filter
13a, 13b Sign inversion detection unit
14 Rotation judgment unit
15 Counter unit
16 Adjacent channel interference detection unit
17 Magnitude comparison unit
80 Car
81 Car radio

BEST MODE FOR CARRYING OUT THE INVENTION

Embodiments of the present invention are described below, with reference to drawings.

First Embodiment

FIG. 1 is a block diagram showing a structure of an adjacent channel interference detection apparatus 4 in a first embodiment of the present invention.

In FIG. 1, the adjacent channel interference detection apparatus 4 is an apparatus that receives an IF signal 100 which has been converted to a digital signal by AD conversion, and includes a local oscillation unit 10 that generates two signals which have a same frequency as a center frequency of the IF signal 100 and differ in phase from each other by 90 degrees, two mixer units 11a and 11b that mix the IF signal 100 as a digital signal respectively with the two signals generated by the local oscillation unit 10, and two low pass filter units 12a and 12b that perform low pass filtering on outputs of the respective mixer units 11a and 11b to extract a complex baseband signal composed of desired I signal and Q signal. An I signal 101 and a Q signal 102 are then outputted respectively from the low pass filters 12a and 12b.

The adjacent channel interference detection apparatus 4 further includes two sign inversion detection units 13a and 13b that respectively detect sign inversions of the I signal 101 and the Q signal 102, a rotation judgment unit 14 that is connected to outputs of the sign inversion detection units 13a and 13b and judges/detects a rotation direction of the complex baseband signal composed of the I signal 101 and the Q signal 102 on an IQ plane, a counter unit 15 that increases or decreases in count according to an output of the rotation judgment unit 14, and an adjacent channel interference detection unit 16 that detects adjacent channel interference on the basis of the count in the counter unit 15 and generates an adjacent channel interference detection signal 103.

Figure 2:
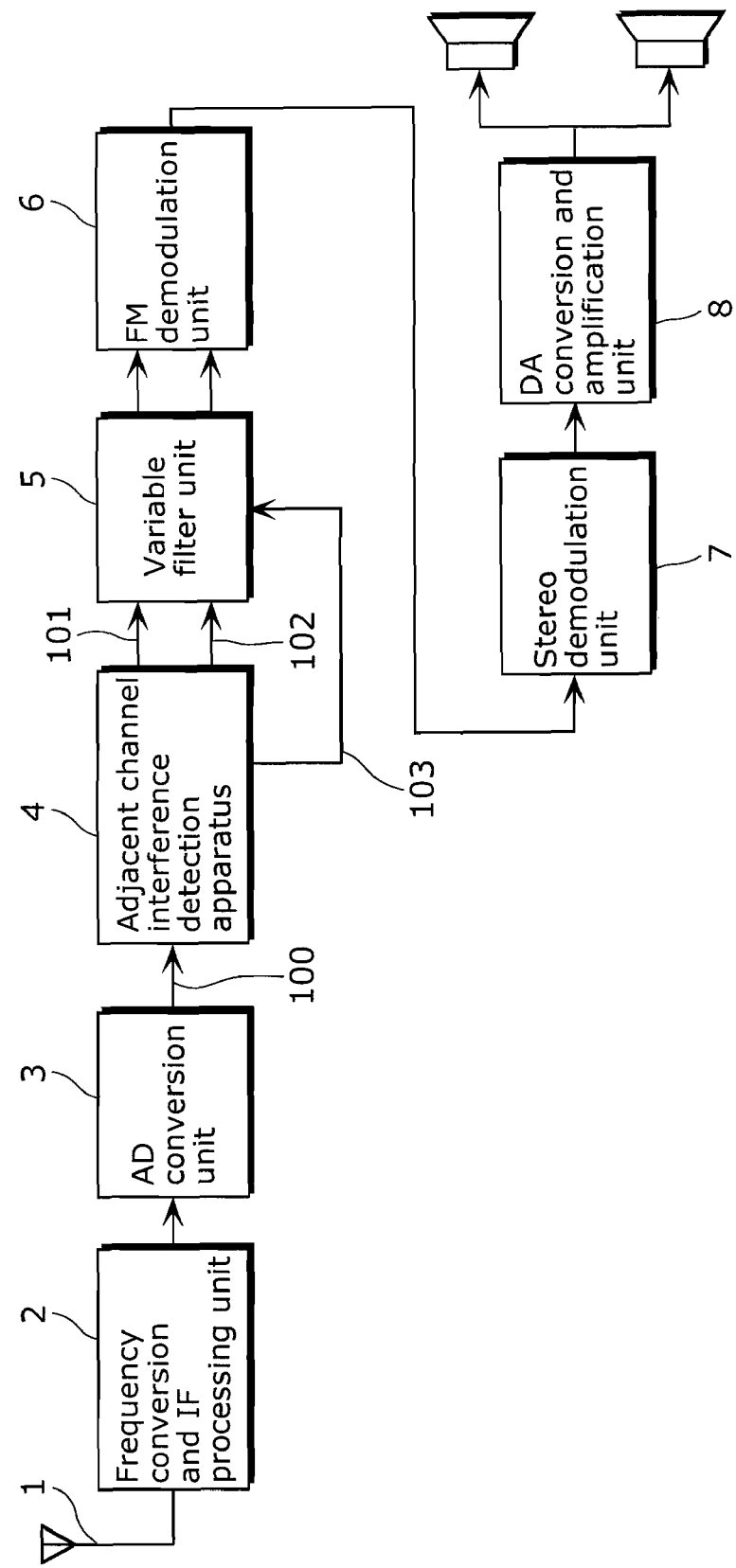
FIG. 2 is a block diagram showing an example of a structure of a radio receiver system that includes the adjacent channel interference detection apparatus in the first embodiment of the present invention as a component.

FIG. 2 is a block diagram showing an example of a structure of a radio receiver system that includes the adjacent channel interference detection apparatus 4 in the first embodiment of the present invention as a component.

The radio receiver system shown in FIG. 2 includes a reception antenna 1, a frequency conversion and IF processing unit 2 that converts an incoming high frequency signal to an IF signal and processes it, an AD conversion unit 3 that converts the IF signal to a digital signal, the adjacent channel interference detection apparatus 4 in the first embodiment of the present invention shown in FIG. 1, a variable filter unit 5, an FM demodulation unit 6, a stereo demodulation unit 7, and a DA conversion and amplification unit 8.

In FIG. 2, the high frequency signal received by the antenna 1 is converted to an IF signal by the frequency conversion and IF processing unit 2, and this IF signal is converted to a digital signal by the AD conversion unit 3 and provided to the adjacent channel interference detection apparatus 4 in the first embodiment of the present invention shown in FIG. 1 as the IF signal 100. Note that the adjacent channel interference detection apparatus 4 shown in the drawing also performs IQ signal generation as mentioned earlier.

The following describes an operation of the adjacent channel interference detection apparatus in the first embodiment of the present invention, with reference to FIG. 1.

The digitized IF signal 100 received as described above is provided to the two mixer units 11a and 11b, and mixed with each of two signals having a same center frequency as the IF signal and differing in phase from each other by 90 degrees, which are generated by the local oscillation unit 10. Resulting signals are supplied to the two low pass filters 12a and 12b and undergo low pass filtering. As a result, a complex baseband signal composed of the I signal 101 and the Q signal 102 is obtained.

Figure 3:
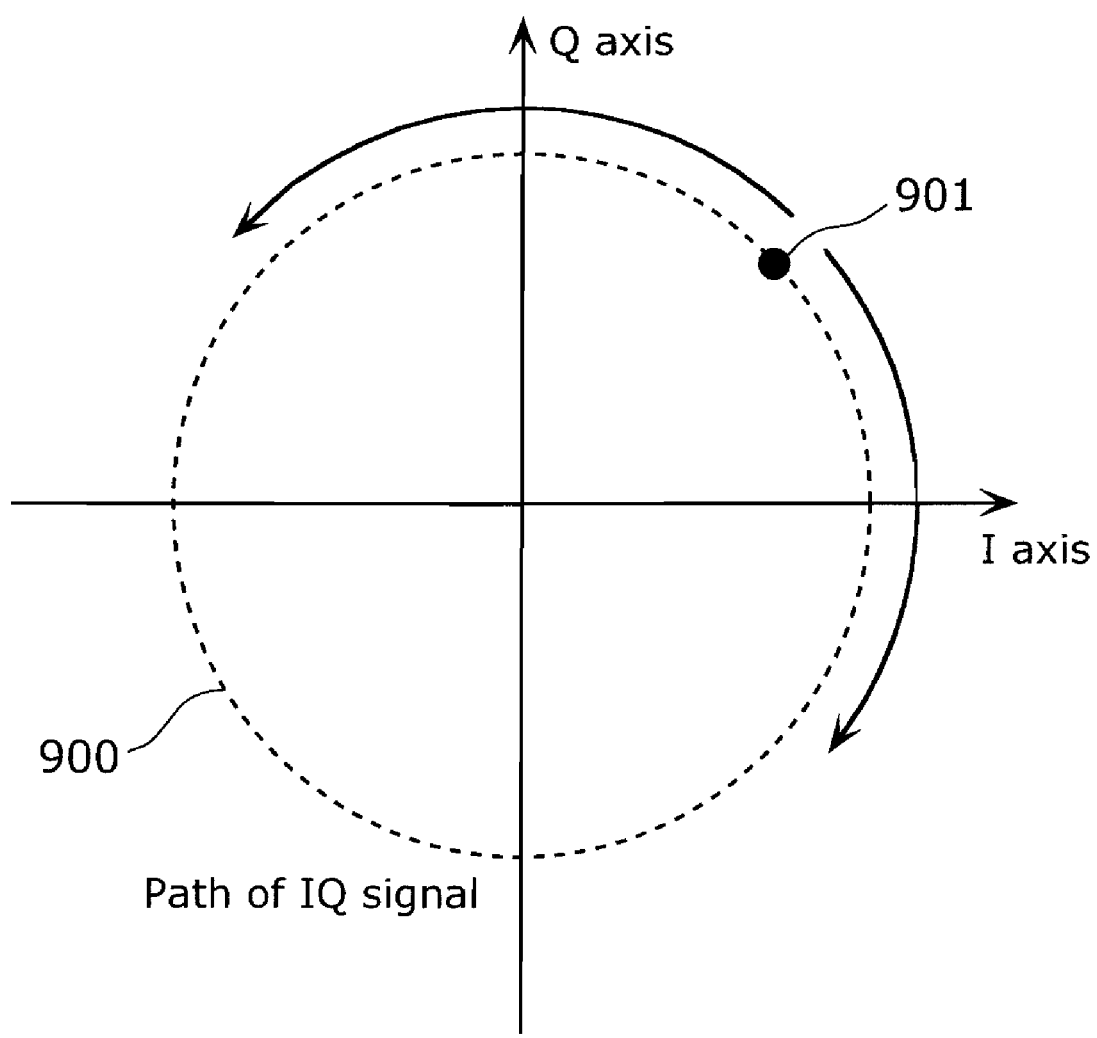
FIG. 3 is an IQ plane view for illustrating an operation of the adjacent channel interference detection apparatus in the first embodiment of the present invention.

Consider the case of plotting a signal point, with a signal value of the I signal 101 and a signal value of the Q signal 102 respectively on the horizontal axis and the vertical axis. For example, when the high frequency signal from the antenna 1 is an FM modulated wave, a signal point 901 moves on a circular path 900 whose radius corresponds to signal intensity, while repeating clockwise rotation and counterclockwise rotation according to frequency shift of the FM modulated wave, as shown in FIG. 3.

In this state, it is known that the signal point 901 rotates clockwise and counterclockwise the same number of times when no adjacent channel interference occurs, but this balance between the number of times the signal point 901 rotates clockwise and the number of times the signal point 901 rotates counterclockwise is lost due to a deviation in IF when adjacent channel interference occurs. Typically a complicated process is required to precisely detect the balance between the number of times of the clockwise rotation and the number of times of the counterclockwise rotation. In the present invention, however, it has been found by experiment that sufficient detection accuracy can be achieved by a simple method of counting the number of times the signal point 901 moves from one quadrant to another on the IQ plane.

The number of times the signal point 901 moves from one quadrant to another on the IQ plane can be easily judged on the basis of a combination of sign inversions of the I signal 101 and the Q signal 102. Accordingly, for example in the case where the signal point 901 exists in the first quadrant at one point in time, it is possible to apply a simple rule such as increasing the counter by 1 when the signal point 901 moves to the second quadrant, decreasing the counter by 1 when the signal point 901 moves to the fourth quadrant, and neither increasing nor decreasing the counter when the signal point 901 moves to the third quadrant. Thus, according to the above new findings, the balance between the number of times of the clockwise rotation and the number of times of the counterclockwise rotation of the signal point can be detected efficiently.

In the adjacent channel interference detection apparatus 4 according to the present invention, the two sign inversion detection units 13a and 13b shown in FIG. 1 respectively detect sign inversions of the I signal 101 and the Q signal 102. The rotation judgment unit 14 detects the clockwise rotation or the counterclockwise rotation of the signal point on the basis of outputs of the two sign inversion detection units 13a and 13b in accordance with a rule such as the example given above, and drives the counter unit 15. When no adjacent channel interference occurs, the count in the counter unit 15 will end up being approximately 0. When adjacent channel interference occurs, on the other hand, the count in the counter unit 15 will end up being a positive value or a negative value. On the basis of this count, the adjacent channel interference detection unit 16 lastly generates the adjacent channel interference detection signal 103, for example when the count exceeds a predetermined threshold.

Further description is given below, by referencing FIG. 2 again. The adjacent channel interference detection signal 103 generated as described above is supplied to the variable filter unit 5 as shown in FIG. 2.

The variable filter unit 5 performs a filtering process on the incoming I signal 101 and Q signal 102 according to the adjacent channel interference detection signal 103, thereby removing adjacent channel interference.

In detail, this filtering process performed by the variable filter unit 5 in adjacent channel interference removal is, for example, a process of selecting a band pass filter of a narrower frequency range to reduce a bandwidth when a larger imbalance in rotation direction of the signal point on the IQ plane is detected by the adjacent channel interference detection apparatus 4, or a process of shifting a center frequency upward or downward to a greater extent when a larger imbalance in rotation direction of the signal point on the IQ plane is detected by the adjacent channel interference detection apparatus 4. Adjacent channel interference is removed as a result of this process by the variable filter unit 5.

The I signal and the Q signal from which adjacent channel interference has been removed are demodulated by the FM demodulation unit 6, as a result of which a composite signal is extracted. The composite signal is a multiplexed signal containing a main signal and sub-signal of stereo audio, a pilot signal for stereo demodulation, and the like. The composite signal is demodulated to a stereo audio signal by the stereo demodulation unit 7, and converted to analog and amplified by the DA conversion and amplification unit 8 to eventually produce an output of an audio signal from which adjacent channel interference has been removed.

At present, the functions from the AD conversion unit 3, the adjacent channel interference detection apparatus 4, the variable filter unit 5, the FM demodulation unit 6, up to the stereo demodulation unit 7 can be implemented as one-chip LSI. In the future, however, all of the functions shown in FIG. 2 including the frequency conversion and IF processing unit 2 and the DA conversion and amplification unit 8 will be able to be implemented as one-chip LSI.

Figure 4:
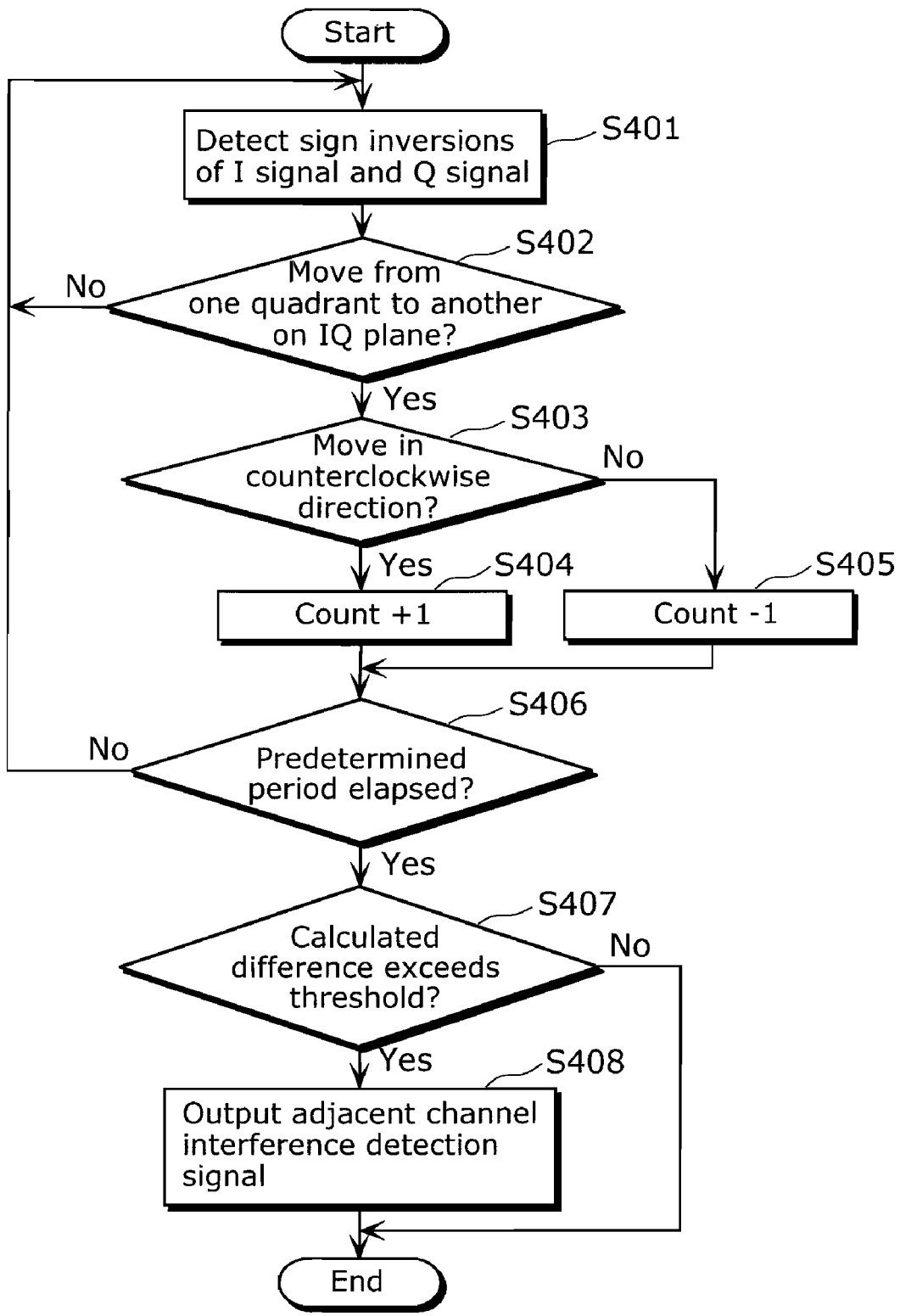
FIG. 4 is a flowchart showing an operational procedure of the adjacent channel interference apparatus in the first embodiment.

FIG. 4 is a flowchart showing an operational procedure of the adjacent channel interference detection apparatus in the first embodiment.

First, the sign inversion detection units 13a and 13b in the adjacent channel interference detection apparatus 4 detect the sign inversions of the I signal and the Q signal, respectively (Step S401).

Next, the rotation judgment unit 14 detects the rotation direction of the signal point and judges whether or not the signal point moves from one quadrant to another on the IQ plane, using information of the detected signs of the I signal and the Q signal (Step S402).

When judging that the signal point moves from one quadrant to another on the IQ plane (Step S402: Yes), the rotation judgment unit 14 detects the direction in which the signal point moves from one quadrant to another. On the basis of this detection, for example the counter unit 15 counts +1 (Step S404) when the signal point moves from one quadrant to another in the counterclockwise direction such as in the case of moving from the first quadrant to the second quadrant (Step S403: Yes), and counts −1 (Step S405) when the signal point moves from one quadrant to another in the clockwise direction such as in the case of moving from the first quadrant to the fourth quadrant (Step S403: No).

The series of these processes is conducted for a predetermined period such as 10 ms (Step S406). When the predetermined period has elapsed, the adjacent channel interference detection unit 16 judges whether or not the count in the counter unit 15 exceeds the predetermined threshold (Step S407). When the count in the counter unit 15 exceeds the threshold (Step S407: Yes), the adjacent channel interference detection unit 16 judges that adjacent channel interference occurs, and provides the adjacent channel interference detection signal to the variable filter unit 5 (Step S408). Upon receiving the adjacent channel interference detection signal, the variable filter unit 5 performs a process such as selecting a filter of a narrower range, as described above.

When the difference does not exceed the threshold (Step S407: No), the adjacent channel interference detection unit 16 judges that no adjacent channel interference occurs, and ends the procedure without generating the adjacent channel interference detection signal.

According to this structure, with the provision of the sign inversion detection units 13a and 13b that detect sign inversions of the I signal 101 and the Q signal 102, the rotation judgment unit 14, the counter unit 15, and the adjacent channel interference detection unit 16, the balance between the number of times of the clockwise rotation and the number of times of the counterclockwise rotation of the signal point in relation to adjacent channel interference can be detected efficiently by an extremely simple structure. Hence an adjacent channel interference detection apparatus having high detection sensitivity and suitable for LSI integration can be realized in an extremely small circuit size.

This embodiment describes the case where an up-down counter is used as the counter unit 15. Alternatively, two typical up counters may be provided to separately count the number of times of the clockwise rotation and the number of times of the counterclockwise rotation and calculate their difference. Moreover, the same effects can be achieved when the processing units described in this embodiment are implemented as individual components constituting an apparatus or when all of the processing units are integrated on one or more LSI chips.

Furthermore, each of the processing units included in the apparatus described above can be changed to a processing step so that the present invention can be realized by software processing.

Second Embodiment

The following describes an adjacent channel interference detection apparatus in a second embodiment of the present invention.

Figure 5:
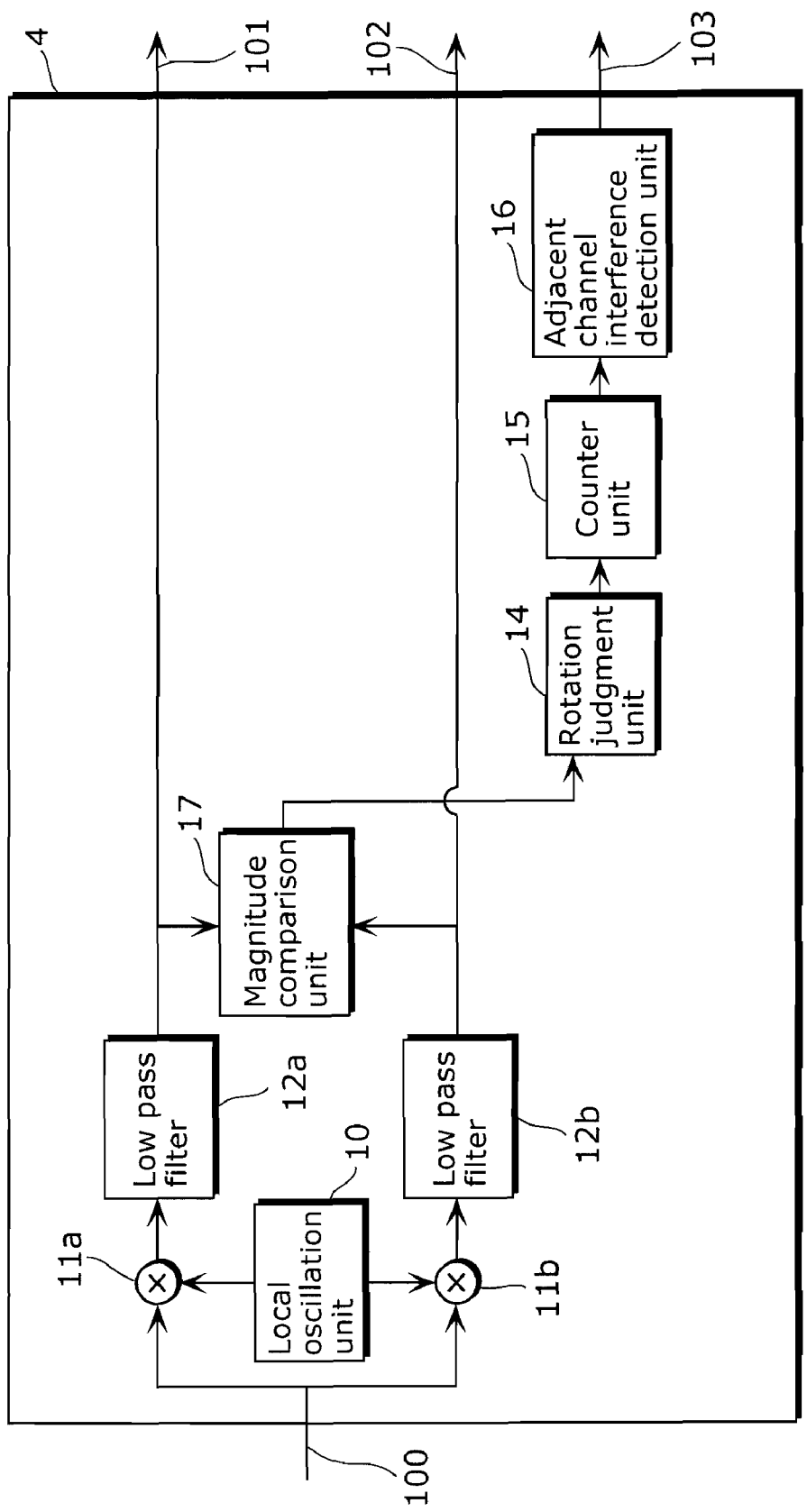
FIG. 5 is a block diagram showing a structure of an adjacent channel interference detection apparatus in a second embodiment of the present invention.

FIG. 5 is a block diagram showing a structure of the adjacent channel interference detection apparatus in the second embodiment of the present invention. In FIG. 5, components which are the same as those in FIG. 1 have been given the same reference numerals, and their explanation has been omitted here.

The adjacent channel interference detection apparatus shown in FIG. 5 is characterized in that a magnitude comparison unit 17 that detects a change in magnitude relation of the I signal 101 and the Q signal 102 is provided instead of the sign inversion detection units 13a and 13b in FIG. 1.

Figure 6:
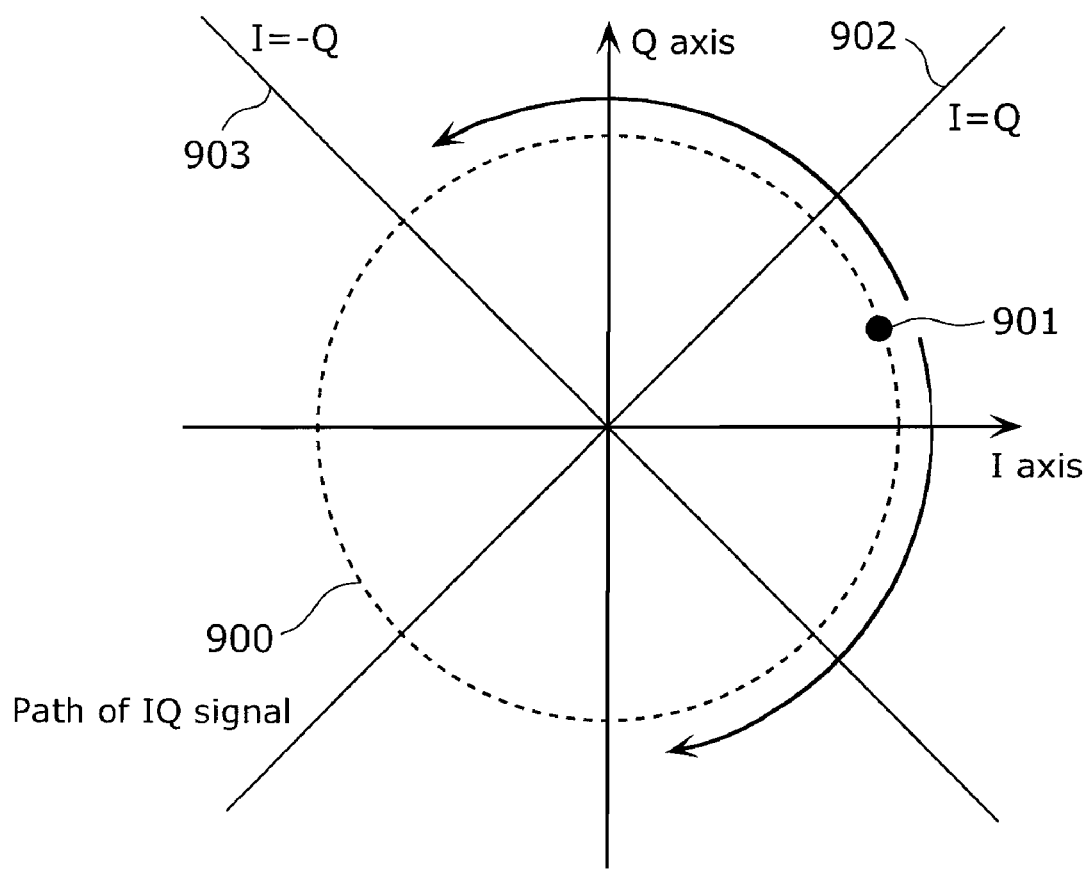
FIG. 6 is an IQ plane view for illustrating an operation of the adjacent channel interference detection apparatus in the second embodiment of the present invention.

According to this structure, on the basis of the magnitude relation of the I signal 101 and the Q signal 102 detected by the magnitude comparison unit 17, the IQ plane can be divided into four areas by a line 902 where I=Q and a line 903 where I=−Q as shown in FIG. 6, and the movement of the signal point 901 between these four areas can be detected. This enables the rotation judgment unit 14 to detect the clockwise rotation or the counterclockwise rotation of the signal point, the counter unit 15 to perform the counting, and the adjacent channel interference detection unit 16 to detect whether or not adjacent channel interference occurs on the basis of the count, in the same way as in the first embodiment.

Figure 7:
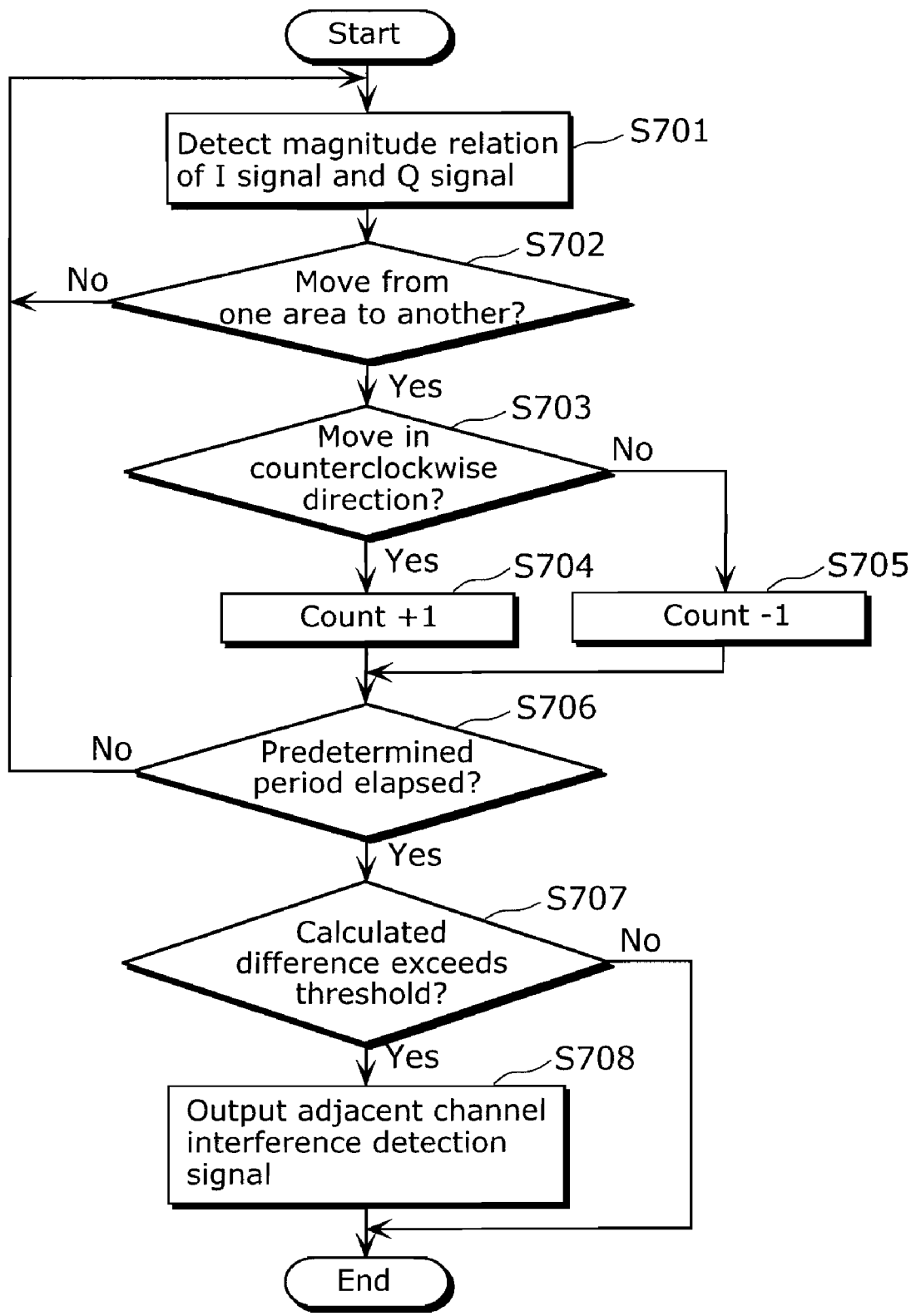
FIG. 7 is a flowchart showing an operational procedure of the adjacent channel interference apparatus in the second embodiment.

FIG. 7 is a flowchart showing an operational procedure of the adjacent channel interference apparatus in the second embodiment.

First, the magnitude comparison unit 17 detects the magnitude relation of the I signal and the Q signal (Step S701).

Next, the rotation judgment unit 14 detects the rotation direction of the signal point and judges whether or not the signal point moves from one area to another out of the four areas which have been set as described above, using information of the detected magnitude relation of the I signal and the Q signal (Step S702).

When judging that the signal point moves from one area to another on the IQ plane (Step S702: Yes), the rotation judgment unit 14 detects the direction in which the signal point moves from one area to another. On the basis of this detection, for example the counter unit 15 counts +1 (Step S704) when the signal point moves from one area to another in the counterclockwise direction (Step S703: Yes), and counts −1 (Step S705) when the signal point moves from one area to another in the clockwise direction (Step S703: No).

The series of these processes is conducted for a predetermined period such as 10 ms (Step S706). When the predetermined period has elapsed, the adjacent channel interference detection unit 16 judges whether or not the count in the counter unit 15 exceeds a predetermined threshold (Step S707). When the count in the counter unit 15 exceeds the threshold (Step S707: Yes), the adjacent channel interference detection unit 16 judges that adjacent channel interference occurs, and provides the adjacent channel interference detection signal to the variable filter unit 5 (Step S708).

When the difference does not exceed the threshold (Step S707: No), the adjacent channel interference detection unit 16 judges that no adjacent channel interference occurs, and ends the procedure without generating the adjacent channel interference detection signal.

According to this structure too, the balance between the number of times of the clockwise rotation and the number of times of the counterclockwise rotation of the signal point in relation to adjacent channel interference can be detected efficiently by an extremely simple structure. Hence an adjacent channel interference detection apparatus having high detection sensitivity and suitable for LSI integration can be realized in an extremely small circuit size.

Moreover, as is apparent from FIG. 6, the IQ plane can be divided into eight areas by combining the structure of the second embodiment with the structure of the first embodiment described earlier.

In such a case, though the circuit size may increase to some extent, adjacent channel interference can be detected with higher sensitivity.

Each of the above embodiments describes the case where the counter unit in the adjacent channel interference detection apparatus counts +1 when the signal point moves from one quadrant or area to another in the counterclockwise direction on the IQ plane, and counts −1 when the signal point moves from one quadrant or area to another on the IQ plane in the clockwise direction. However, this up-down counting of the counter unit may be reversed so that the counter unit counts −1 when the signal point moves from one quadrant or area to another in the counterclockwise direction, and counts +1 when the signal point moves from one quadrant or area to another in the clockwise direction.

Furthermore, each of the units included in the apparatus described above may be changed to a processing step so that the present invention can be realized by software processing.

Figure 8:
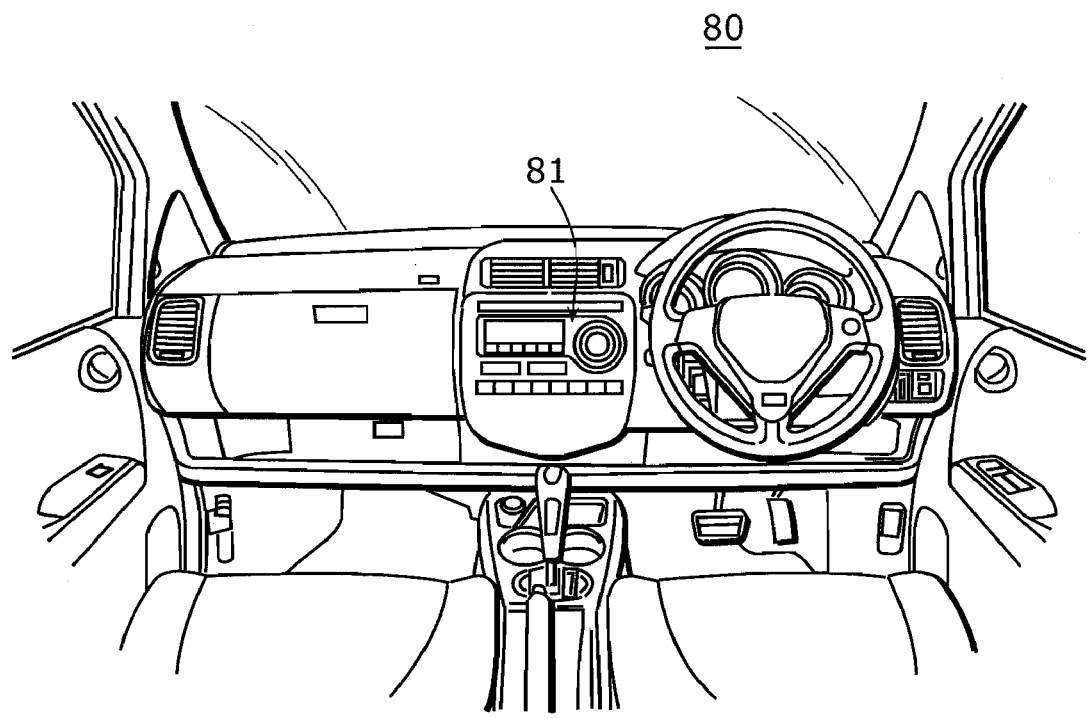
FIG. 8 is a perspective view of a car provided with a car radio that includes the adjacent channel interference detection apparatus according to the present invention.

FIG. 8 is a perspective view of a car 80 provided with a car radio 81 that includes the adjacent channel interference detection apparatus according to the present invention. As shown in FIG. 8, the adjacent channel interference detection apparatus according to the present invention can be applied, for example, to the car radio 81 as vehicle-mounted equipment.

INDUSTRIAL APPLICABILITY

The adjacent channel interference detection apparatus and method according to the present invention have high detection sensitivity, are suitable for LSI integration, and can be realized in an extremely small circuit size. Therefore, the adjacent channel interference detection apparatus and method according to the present invention are very useful for a digital signal processing radio receiver system, particularly its implementation by system LSI.

The invention claimed is:

1. An adjacent channel interference detection apparatus that detects adjacent channel interference between broadcast waves of broadcast stations whose frequency bands are adjacent to each other, said adjacent channel interference detection apparatus comprising:
    a local oscillation unit configured to generate two signals of a predetermined frequency in a free-running state, the two signals of the predetermined frequency being different in phase from each other by 90 degrees;
    two mixer units configured to mix an input signal respectively with the two signals of the predetermined frequency generated by said local oscillation unit;
    two low pass filter units respectively connected to outputs of said two mixer units;
    a rotation judgment unit configured to detect a direction in which a signal point rotates on an IQ plane, according to an I signal and a Q signal outputted respectively from said two low pass filter units;
    a counter unit configured to count an output of said rotation judgment unit; and
    a detection unit configured to detect an imbalance in the number of times the signal point rotates in each direction, according to the count by said counter unit.

2. The adjacent channel interference detection apparatus according to claim 1, further comprising
    two sign inversion detection units respectively connected to outputs of said two low pass filter units, and configured to detect inversions of signs of the I signal and the Q signal outputted from said two low pass filter units,
    wherein said rotation judgment unit is connected to outputs of said two sign inversion detection units, and configured to detect the direction in which the signal point rotates on the IQ plane according to the signs of the I signal and the Q signal,
    said counter unit is configured to count the output of said rotation judgment unit, and
    said detection unit is configured to detect the imbalance in the number of times the signal point rotates in each direction, according to the count by said counter unit.

3. The adjacent channel interference detection apparatus according to claim 2,
    wherein said rotation judgment unit is connected to the outputs of said two sign inversion detection units, and configured to detect whether the signal point rotates on the IQ plane in a clockwise direction or a counterclockwise direction,
    said counter unit is configured to count a difference between the number of times the signal point moves from one quadrant to another on the IQ plane in the clockwise direction and the number of times the signal point moves from one quadrant to another on the IQ plane in the counterclockwise direction, and
    said detection unit is configured to generate an adjacent channel interference detection signal when the difference exceeds a predetermined threshold.

4. The adjacent channel interference detection apparatus according to claim 3,
    wherein said counter unit is configured to count the difference by increasing the count by 1 when the signal point moves from one quadrant to another on the IQ plane in the counterclockwise direction and decreasing the count by 1 when the signal point moves from one quadrant to another on the IQ plane in the clockwise direction, according to the inversions of the signs of the I signal and the Q signal detected by said two sign inversion detection units.

5. The adjacent channel interference detection apparatus according to claim 1, further comprising
    a magnitude comparison unit connected to outputs of said two low pass filter units, and configured to detect a magnitude relation of the I signal and the Q signal,
    wherein said rotation judgment unit is connected to an output of said magnitude comparison unit, and configured to detect the direction in which the signal point rotates on the IQ plane according to the magnitude relation,
    said counter unit is configured to count the output of said rotation judgment unit, and
    said detection unit is configured to detect the imbalance in the number of times the signal point rotates in each direction, according to the count by said counter unit.

6. The adjacent channel interference detection apparatus according to claim 5,
wherein said rotation judgment unit is configured to divide the IQ plane into four areas by a line where I=Q and a line where I=−Q,
said counter unit is configured to count a difference between the number of times the signal point moves from one of the four areas to another in a clockwise direction and the number of times the signal point moves from one of the four areas to another in a counterclockwise direction, and
said detection unit is configured to judge that adjacent channel interference occurs and generate an adjacent channel interference detection signal, when the difference exceeds a predetermined threshold.

7. An adjacent channel interference detection method for detecting adjacent channel interference between broadcast waves of broadcast stations whose frequency bands are adjacent to each other, said adjacent channel interference detection method comprising:
generating two signals of a predetermined frequency in a free-running state, the two signals of the predetermined frequency being different in phase from each other by 90 degrees;
mixing an input signal with each of the two signals of the predetermined frequency generated in said generating;
performing low pass filtering on each of outputs in said mixing;
detecting a direction in which a signal point rotates on an IQ plane, according to an I signal and a Q signal outputted in said performing low pass filtering;
counting an output in said detecting a direction; and
detecting an imbalance in the number of times the signal point rotates in each direction, according to the count in said counting.

8. The adjacent channel interference detection method according to claim 7, further comprising
obtaining outputs in said performing low pass filtering, and detecting inversions of signs of the I signal and the Q signal outputted in said performing low pass filtering,
wherein said detecting a direction includes obtaining outputs in said detecting inversions, and detecting the direction in which the signal point rotates on the IQ plane according to the signs of the I signal and the Q signal,
said counting includes counting the output in said detecting a direction, and
said detecting an imbalance includes detecting the imbalance in the number of times the signal point rotates in each direction, according to the count in said counting.

9. The adjacent channel interference detection method according to claim 7, further comprising
obtaining outputs in said performing low pass filtering, and detecting a magnitude relation of the I signal and the Q signal,
wherein said detecting a direction includes obtaining an output in said detecting a magnitude relation, and detecting the direction in which the signal point rotates on the IQ plane according to the magnitude relation,
said counting includes counting the output in said detecting a direction, and
said detecting an imbalance includes detecting the imbalance in the number of times the signal point rotates in each direction, according to the count in said counting.

10. A radio receiver comprising:
a frequency conversion and IF processing unit configured to convert a high frequency signal received from an antenna, to an IF signal;
the adjacent channel interference detection apparatus according to claim 1 configured to detect adjacent channel interference using the input IF signal;
a variable filter unit configured to perform a filtering process on the input I signal and Q signal, according to an adjacent channel interference detection signal from said adjacent channel interference detection apparatus; and
a demodulation and amplification unit configured to demodulate the I signal and the Q signal received from said variable filter unit to extract a composite signal, and demodulate and amplify the composite signal to a stereo audio signal,
wherein said variable filter unit is configured to select a band pass filter of a narrower frequency range when a larger imbalance in the number of times the signal point rotates in each direction on the IQ plane is detected by said adjacent channel interference detection apparatus, or shift a center frequency upward or downward to a greater extent when a larger imbalance in the number of times the signal point rotates in each direction on the IQ plane is detected by said adjacent channel interference detection apparatus.

11. A radio reception method comprising:
converting a high frequency signal received from an antenna, to an IF signal;
detecting adjacent channel interference using the input IF signal according to claim 1;
performing a filtering process on the input I signal and Q signal, according to an adjacent channel interference detection signal generated in said detecting adjacent channel interference; and
demodulating the I signal and the Q signal after said performing a filtering process to extract a composite signal, and demodulating and amplifying the composite signal to a stereo audio signal,
wherein said performing a filtering process includes selecting a band pass filter of a narrower frequency range when a larger imbalance in the number of times the signal point rotates in each direction on the IQ plane is detected in said detecting adjacent channel interference, or shifting a center frequency upward or downward to a greater extent when a larger imbalance in the number of times the signal point rotates in each direction on the IQ plane is detected in said detecting adjacent channel interference.

12. An integrated circuit comprising:
a local oscillation circuit that generates two signals of a predetermined frequency in a free-running state, the two signals of the predetermined frequency being different in phase from each other by 90 degrees;
two mixer circuits that mix an input signal respectively with the two signals of the predetermined frequency generated by said local oscillation circuit;
two low pass filter circuits respectively connected to outputs of said two mixer circuits;
a rotation judgment circuit that detects a direction in which a signal point rotates on an IQ plane, according to an I signal and a Q signal outputted respectively from said two low pass filter circuits;
a counter circuit that counts an output of said rotation judgment circuit; and
a detection circuit that detects an imbalance in the number of times the signal point rotates in each direction, according to the count by said counter circuit.

* * * * *